United States Patent [19]

King et al.

[11] Patent Number: 5,010,769

[45] Date of Patent: Apr. 30, 1991

[54] AUTOMATIC PSEUDOKEYPHASOR GENERATOR

[75] Inventors: Ian J. King, Winter Springs; Michael P. Chow, Orlando, both of Fla.

[73] Assignee: Westinghouse Electric Corp., Pittsburgh, Pa.

[21] Appl. No.: 473,004

[22] Filed: Jan. 31, 1990

[51] Int. Cl.$^5$ .............................................. G01N 29/00
[52] U.S. Cl. ...................................... 73/660; 364/508; 377/23
[58] Field of Search ................... 377/19, 23; 364/508, 364/566; 73/660

[56] References Cited

U.S. PATENT DOCUMENTS

| | | | |
|---|---|---|---|
| 4,352,293 | 10/1982 | Kurihara et al. | 364/508 |
| 4,435,770 | 3/1984 | Shiohata et al. | 364/508 |
| 4,607,529 | 8/1986 | Morey | 73/660 |
| 4,614,117 | 9/1986 | Taniguti | 364/508 |
| 4,722,094 | 1/1988 | Goodzey | 377/23 |
| 4,758,964 | 7/1988 | Bittner et al. | 364/508 |

*Primary Examiner*—John S. Heyman

[57] ABSTRACT

A pseudokeyphasor signal control unit incorporated into apparatus for analyzing the vibratory behavior of a rotating machine in response to signals representing vibrations occuring in the machine, which apparatus includes: a controllable signal generator connected to receive an input signal representing the rate of rotation of the machine and to produce an output signal representing a rate of rotation bearing a selected relation to the rate of rotation represented by the input signal, the generator being responsive to digital signals which set the value of the selected relation; and a signal analyzing device connected to receive the signals representing vibrations and the output signal from the signal generator for processing the signals representing vibrations as a function of the machine rotation rate represented by the output signal from the signal generator. The unit is composed of a digital signal supply member providing first digital signals representing the value of the selected relation; and an electrically controlled signal supply member connected between the digital signal supply member and the controllable signal generator for supplying to the controllable signal generator second digital signals which correspond to the first digital signals and which act to set the value of the selected relation.

7 Claims, 1 Drawing Sheet

AUTOMATIC PSEUDOKEYPHASOR GENERATOR

BACKGROUND OF THE INVENTION

The present invention relates to the monitoring of vibrations occurring in components of large rotating machines, such as, for example, the bearings of turbine generators utilized in power plants.

It is known to monitor vibrations occurring in such equipment by the use of displacement, velocity and/or acceleration pickups. In order to obtain an understanding of the vibration behavior of the machine, it is also known to apply the resulting vibration signals to an analysis instrument, such as a tracking filter, a vector filter or a Fast Fourier Transform analyzer which provides detailed vibration information indicating, for example, the primary frequency and/or the amplitude of vibration of the machine, or the part being monitored. Such analysis devices are also supplied with a signal representative of the speed of rotation of the machine, which signal may be provided by a supervisory instrument associated with the machine.

It is also known that various types of information can be obtained by supplying the analyzing device with signals representing different harmonics of the basic frequency of rotation of the machine. This signal acts to tune the analyzing device. Thus, for example, if the analyzing device is tuned by a signal corresponding to the rotational speed of the machine, the vibration signal analysis will provide indications of the state of balance of the rotating components. When the signal corresponding to the rotational speed of the machine consists of one pulse per machine revolution, it is generally termed a keyphasor signal. A signal having a pulse rate different than one pulse per machine revolution will be termed herein a pseudokeyphasor signal. If the pseudokeyphasor signal corresponds to one-half the rotational speed of the machine, the analyzed vibration signals can provide information relating to conditions such as a rub condition, while a pseudokeyphasor signal corresponding to two times the rotational speed of the machine will enable the vibration signals to be analyzed in a manner to provide indications of conditions such as shaft cracking, etc. Pseudokeyphasor signals representing other harmonics or subharmonics of the rotational speed of the machine can provide other types of information relating to the operating state of the machine.

To obtain information of the desired type, the data provided by a plurality of sensors associated with the machine must be supplied simultaneously to the analyzing device together with the pseudokeyphasor signal to allow amplitude and phase comparisons to be performed.

Pseudokeyphasor signals representing various harmonics of the speed of rotation of the machine can be generated by a device such as a keyphasor multiplier/divider, devices of this type being marketed, for example, by the Bentley Nevada Company. This device is constructed to receive, from supervisory instruments of the machine being tested, a basic keyphasor signal containing one pulse per revolution of the machine and generates a reference signal having a pulse rate related to, but substantially higher than, the basic keyphasor signal.

For example, the generated reference signal may have a pulse rate 1,000 times that of the basic signal. The reference signal is then divided down to generate a pseudokeyphasor signal in the form of a pulse train having a selected pulse rate. The device includes a first manually operable control element which constitutes a multiplier for setting a selected pulse rate multiplying factor and a second manually operable control element which constitutes a divider for setting a selected pulse rate dividing factor. Both factors are integral values and serve to give the pseudokeyphasor signal pulse rate a value equal to a basic rate corresponding directly to the rate of rotation of the machine, multiplied by the multiplying factor and divided by the dividing factor.

For example, if both control elements are placed at a setting corresponding to multiplication and division factors of unity, the keyphasor multiplier/divider can be arranged to produce a pulse train consisting of one pulse for each revolution of the machine. The multiplier can be set to multiply this pulse rate by an integral value of 2, 3, etc., and the divider can be set to divide that pulse rate by an integral factor of 2, 3, etc.

In the specific multiplier/divider unit described above, each control element is a digital element producing a plural bit binary signal constituting a binary representation of the desired multiplication or division factor. Since the control elements must be set manually, their settings cannot be changed rapidly so that the tuning of the analyzing device cannot be varied at short intervals, such as would be required to obtain complete analysis data during start-up and coastdown of the machine. Moreover, if it is desired to utilize a data processing system to interpret the information provided by the analyzer, information relating to the settings of the control elements of the keyphasor multiplier/divider must be manually input to the data processing system.

SUMMARY OF THE INVENTION

It is a primary object of the present invention to enhance the data acquisition capabilities of a vibration analyzing device which processes vibration signals as a function of the speed of rotation of the rotating machine from which such vibration signals are derived.

Another object of the invention is to facilitate control of the signal representing the rate of rotation of the machine.

A more specific object of the invention is to vary the signal representative of the rotation rate of the machine in any desired sequence and time pattern.

A further specific object of the invention is to control the signal representative of the rate of rotation of the machine by means of a digital processing system.

The above and other objects are achieved, according to the present invention, in apparatus for analyzing the vibratory behavior of a rotating machine in response to signals representing vibrations occurring in the machine, which apparatus includes: a controllable signal generator connected to receive an input signal representing the rate of rotation of the machine and to produce an output signal representing a rate of rotation bearing a selected relation to the rate of rotation represented by the input signal, the generator being responsive to digital signals which set the value of the selected relation; and a signal analyzing device connected to receive the signals representing vibrations and the output signal from the signal generator for processing the signals representing vibrations as a function of the machine rotation rate represented by the output signal from the signal generator, by the provision of: digital signal supply means providing first digital signals representing the value of the selected relation; and electrically controlled signal generating means connected between the digital signal supply means and the controllable signal generator for supplying to the controllable signal generator second digital signals which correspond to the first digital signals and which act to set the value of the selected relation.

DESCRIPTION OF THE PREFERRED EMBODIMENTS

Figure 1:
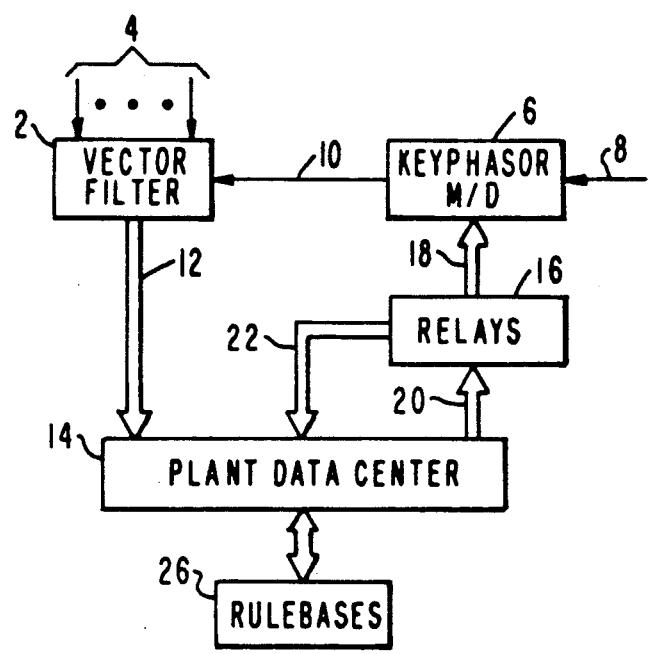
FIG. 1 is a block diagram of a vibration analyzing system incorporating a control arrangement according to the present invention.

FIG. 1 illustrates a vibration data acquisition and analyzing system which includes, in the case of the specific illustrated embodiment, a vector filter 2 which contains a plurality of signal processing channels connected, via a plurality of input conductors 4, to simultaneously receive signals produced by a plurality of vibration transducers, the signals from each vibration transducer being supplied to a respective processing channel.

Vector filter 2 is further connected to a keyphasor multiplier/divider 6 which receives, via a conductor 8 connected to machine supervisory equipment, a signal bearing a fixed relation to the speed of rotation of the machine under examination. Device 6 supplies, via a conductor 10, a signal bearing a selected proportional relation to the signal on conductor 8. Typically, the signal on conductor 8 is in the form of a pulse train containing a fixed number of pulses for each revolution of the machine under examination, known systems providing one pulse per revolution. The signal in conductor 10 will be in the form of a train of pulses having a repetition rate bearing a selected relation to the repetition rate of the pulses supplied via conductor 8. The exact proportion is determined by the setting of two control elements in keyphasor multiplier/divider 6, one of these elements being set to perform a multiplication operation, and the other being set to perform a division operation, as described earlier herein.

Both vector filter 2 and keyphasor multiplier/divider 6 may be constituted by commercially available devices, although device 6 is modified, in a manner to be described below, in accordance with the present invention. Filter 2 processes the vibration signals applied via each conductor 4 as a function of the machine speed signal supplied via conductor 10 in order to produce temporally coherent data at the outputs of all of its channels.

This data may be supplied, via a bus 12, to a plant data center 14 where the data is interpreted in a conventional manner.

As noted above, keyphasor multiplier/divider 6 conventionally includes two control elements which, in the commercially available device, are manually operable, e.g., via thumbwheels. Positioning of each thumbwheel controls the generation of a plural bit binary signal which determines the multiplication or division factor of the device. It will be appreciated that since these settings must be effected manually, the setting operation cannot be automated and the settings cannot be changed at short intervals in the existing device.

According to the present invention, the manual setting components are eliminated, or at least deactivated, and the binary signal conductors associated therewith are connected to a set of relays 16 connected to device 6 via a bus 18 and to plant data center 14 via buses 20 and 22.

Bus 18 supplies bit signals in the form of voltages sufficient to control unit 6, while bus 20 supplies operating signals to relays 16 and bus 22 supplies relay status signals to plant data center 14.

During vibration monitoring of a rotating device, vibration signals supplied to filter 2 can be analyzed with respect to any desired harmonic or subharmonic of the machine rotation rate during selected intervals controlled by signals supplied to relays 16 from plant data center 14. The operation of data center 14 can, in turn, be controlled on the basis of a stored set of rulebases 26 defining the machine rotation harmonics which are to be employed and the sequence and timing of the application of signals, via conductor 10, associated with each selected harmonic. The establishment of such rulebases and the structure and operation of the plant data center, which is essentially a data processing system, are based on principles known in the art.

With this arrangement, the data provided by filter 2 can be interpreted and employed directly in cooperation with the rulebases to rapidly produce diagnostic results.

Such diagnostic results would be obtained in a manner known in the art on the basis of amplitude, phase and frequency information derived by filter 2.

While the illustrated embodiment utilizes a vector filter, it is to be understood that the present invention could be applied to other known types of data analyzing devices which operate in conjunction with a signal representative of machine rotation, such devices including, among others, tracking filters and Fast Fourier Transform analyzers. The ability to control the signal dependent on the rate of machine rotation in accordance with the present invention enables such analyzers to provide data relating to conditions existing during machine startup and coastdown.

Figure 2:
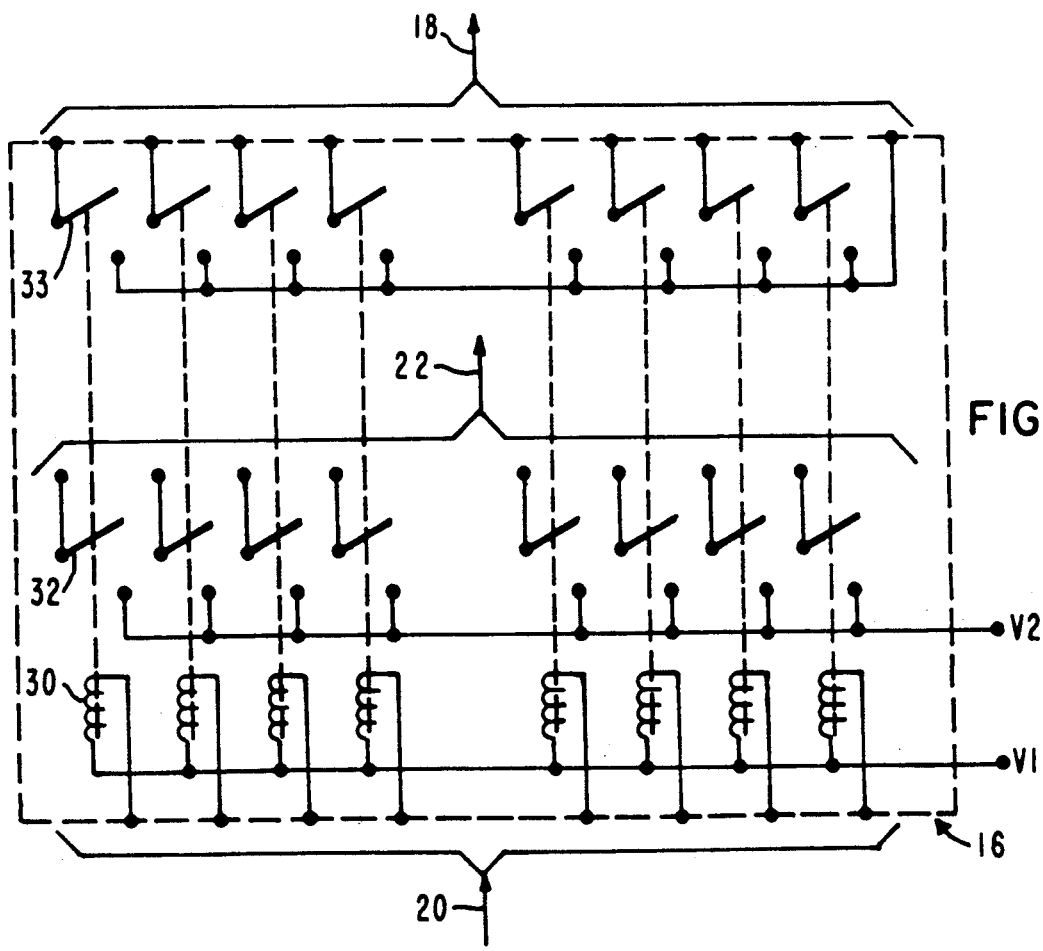
FIG. 2 is a circuit diagram of one preferred embodiment of a control device according to the present invention.

One suitable embodiment of relays 16 is illustrated in FIG. 2 for use with a keyphasor multiplier/divider in which the multiplication and division factors are each controlled by four-bit digital signals. For this purpose, four relays are provided for supplying the bit signals for controlling the multiplication factor and four relays are provided for supplying the bit signals for controlling the division factor. Each relay includes a coil 30 connected between a source of operating voltage V1 and a respective conductor of bus 20, a first movable switch, or pole, 32 having its fixed contact connected to one conductor of bus 22, and a second movable switch, or pole, 33 having its fixed contact connected to one conductor of bus 18. The normally open contact of the first switch 32 of each relay is connected to a source of voltage V2 selected to supply an appropriate signal level to data center 14. The normally open contact of the second switch 33 of each relay is connected to a conductor of bus 18. The latter conductor of bus 18 is connected in unit 6 to a source of an operating voltage for each control element of unit 6.

When a relay coil 30 is energized, its associated switches 32 and 33 are switched in a manner to supply to the associated fixed contact of switch 32 a voltage V2 having the magnitude required for supplying a relay actuation monitoring signal to data center 14 and to connect the associated fixed contact of switch 33 to the above-mentioned source of operating voltage in unit 6. Connection of each bus 18, 22 to a separate relay switch also serves to electrically isolate the two busses and the circuits to which they are connected.

The energization of each relay coil 30 is controlled by the signal state at a respective signal output of plant data center 14. Typically, the signal state of an output terminal of a digital data processing device is in the form of an impedance value; a signal state corresponding to a binary "1" will be represented by a low impedance to ground, while a binary "0" will be constituted by a high impedance. Thus, when the signal on a particular line of bus 20 represents a binary "1", that line will represent a low impedance, which closes a current path through the associated relay coil 30 to energize that relay.

The status of relays 16 will be reliably indicated by signals on bus 22 since these signals are dependent on the actual switching states of the relays, rather than on the signals appearing on the conductors of bus 20. Thus, relays 16 constitute an interface via which the output state of the output terminals of plant data center 14 connected to the lines of bus 20 is transformed into signals suitable for controlling the setting of keyphasor multiplier/divider 6.

It will be appreciated that, in accordance with the spirit of the invention, relays 16 could be replaced by functionally similar devices, such as semiconductor switches.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In apparatus for analyzing the vibratory behavior of a rotating machine in response to signals representing vibrations occurring in the machine, which apparatus includes: a controllable signal generator connected to receive an input signal representing the rate of rotation of the machine and to produce an output signal representing a rate of rotation bearing a selected relation to the rate of rotation represented by the input signal, the generator being responsive to digital signals which set the value of the selected relation; and a signal analyzing device connected to receive the signals representing vibrations and the output signal from the signal generator for processing the signals representing vibrations as a function of the machine rotation rate represented by the output signal from the signal generator, the improvement comprising:
    digital signal supply means providing first digital signals representing the value of the selected relation; and
    electrically controlled signal generating means connected between said digital signal supply means and said controllable signal generator for supplying to said controllable signal generator second digital signals which correspond to the first digital signals and which act to set the value of the selected relation 2. Apparatus as defined in claim 1 wherein said signal generating means comprise a plurality of relays each having a coil and movable switch means which are moved between a first switching state and a second switching state when said coil is supplied with an energizing current, each said coil being connected to said digital signal supply means so that the supply of energizing current is controlled by a respective first digital signal from said digital signal supply means and each said movable switch means being connected to said controllable signal generator for supplying a respective second digital signal having a signal state dependent on the switching state of said movable switch means.

3. Apparatus as defined in claim 2 wherein the first digital signals have a form different from the second digital signals.

4. Apparatus as defined in claim 2 wherein:
    the selected relation represented by the output signal of said controllable signal generator includes a multiplication factor and a division factor;
    said controllable signal generator is responsive to two groups of digital signals, one group defining the value of the multiplication factor and the other group defining the value of the division factor; and said plurality of relays are composed of two groups of relays, each group providing a group of second digital signals defining the value of a respective factor.

5. Apparatus as defined in claim 4 wherein the input signal supplied to said controllable signal generator is constituted by a pulse train having a repetition rate corresponding to the rate of rotation of the machine, and said controllable signal generator is operative to give said output signal the form of a pulse train having a repetition rate different from that of the input signal.

6. Apparatus as defined in claim 5 wherein said signal analyzing device is a vector filter having a plurality of filtering channels each connected to receive a respective signal representing vibrations and said output signal from said controllable signal generator.

7. Apparatus as defined in claim 1 further comprising conductor means connected for supplying to said digital signal supply means third digital signals which correspond to the first digital signals and which act as status signals.

* * * * *